May 9, 1933.  C. A. ETEM  1,908,334
AIR FILTER
Filed March 12, 1931
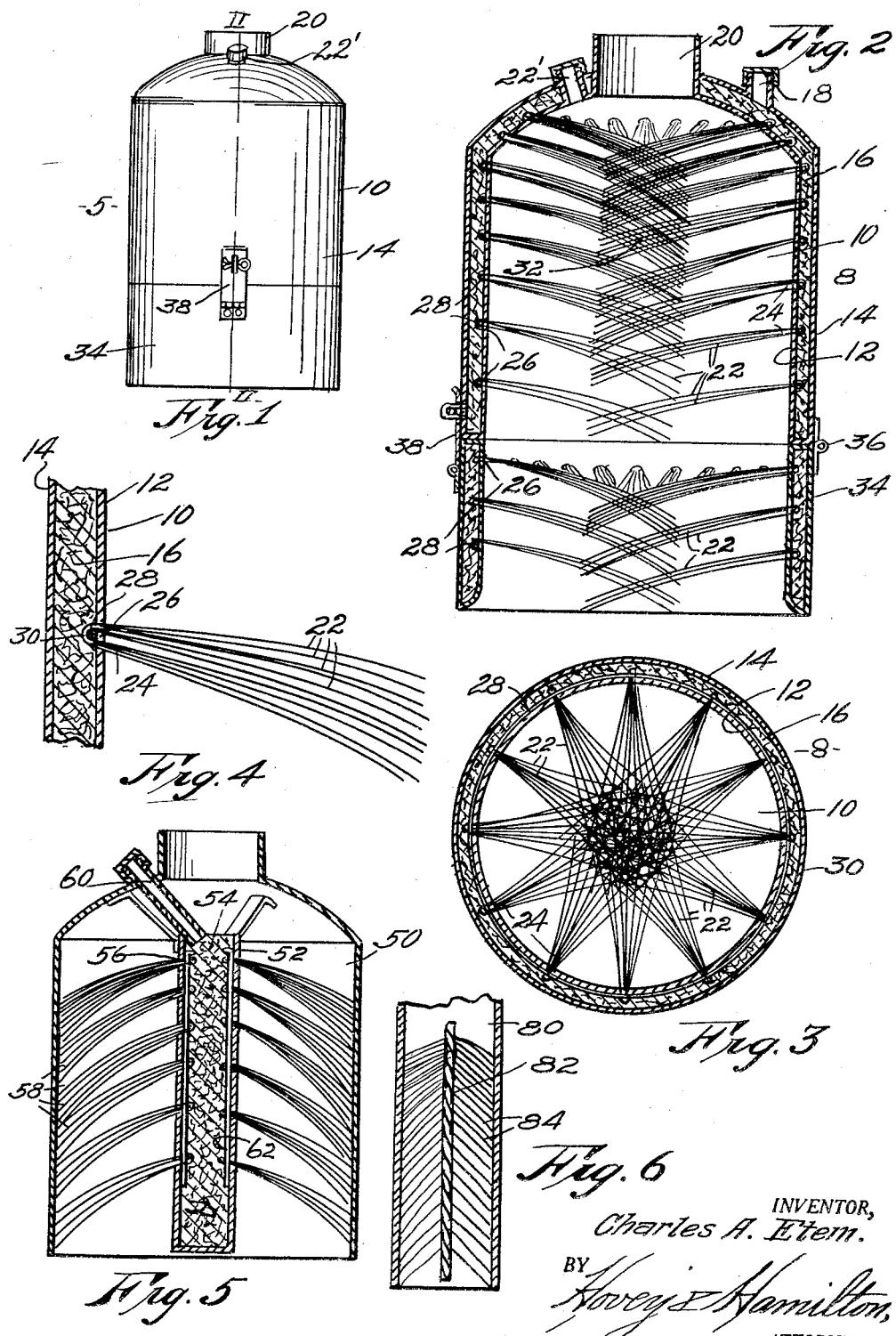
INVENTOR,
Charles A. Etem.
BY Hovey E. Hamilton
ATTORNEYS.

Patented May 9, 1933

1,908,334

UNITED STATES PATENT OFFICE

CHARLES A. ETEM, OF KANSAS CITY, MISSOURI

AIR FILTER

Application filed March 12, 1931. Serial No. 521,898.

The present invention relates to filtering devices and particularly air cleaning apparatus constructed to remove dust concentration from air passing through the filter.

It is well known in this art that air filters having a filling of some material which presents a large number of impinging surfaces have been used to separate dust or other foreign particles from gas or air passing through the filter. In most cases the filtering material is merely a mass of fibrous substance having no particular regularity as to disposition. This well known substance is simply entirely removed from the filter and replaced when dust or foreign particles which it has collected cause a clogging effect. Likewise, in most present day installations, the filter must be removed from its operative position and cleaned by operations which are unhandy to perform and in numerous instances, expensive in view of the replacement of some filtering medium.

The present invention aims to overcome such shortcomings as above set down and, in addition, contemplates the provision of a filter for air or the like, wherein is utilized a large number of vibrating members or spines which present dirt-collecting surfaces and which free themselves of such collected matter even as the filter is in operation.

A further object of this invention is to provide a filter wherein is disposed a large number of comparatively regular positioned tufts of metallic spines, all in communication with a supply of coating liquid which clings to the surface of each and every spine to present an adhesive impinging area that collects, holds and binds together the collected dust particles until they reach a size and weight which permits them to drop by gravity from within the air filter.

A yet further object of this invention is the provision of an air filter wherein is disposed a plurality of spines, each having a portion thereof fixed against movement and each also presenting a portion free to vibrate and contact with other spines forming the filtering medium of the device.

In view of the possibility of using an air filter constructed in accordance with this invention in connection with tractors and other machines working in air which is filled with an excessive amount of dust, the invention further provides an auxiliary section, removably carried by the body of the air filter, which collects the heavier particles of dust from the air and which, as a result, must be cleaned often.

Other objects of the invention, including specific structural details, will appear during the course of the specification, referring to the accompanying drawing, wherein:

Figure 1 is a side elevation of an air filter embodying this invention.

Fig. 2 is a vertical, central section through the device, taken on line II—II of Fig. 1.

Fig. 3 is a horizontal section through the device.

Fig. 4 is an enlarged detailed view illustrating the manner of operably supporting the many tufts of spines.

Fig. 5 is a vertical, central section through an air filter, constructed in accordance with a modified form of the invention, and, Fig. 6 is a similar view through still another modified form of the invention.

Description of the three forms illustrated in the drawing will readily teach one skilled in the art the advantages of an air filter wherein is embodied a large number of spines which present impinging surfaces coated to collect dust particles from the air passing through the filter.

In the case of the form shown in Figs. 1 to 4 inclusive, the invention is embodied in a filter having a body 8 comprising a housing 10, formed by associating in spaced relation, an inner and an outer wall 12 and 14 respectively. The space between walls 12 and 14 presents a reservoir for oil and is preferably packed with a fibrous filling 16, having the characteristics of quickly absorbing any oil or other liquid poured into the reservoir through neck 18. Body 8 is preferably formed circular in cross section and substantially cylindrical in its general make up, the intake end of the body being entirely open from wall to wall and the exit end thereof being restricted by the inwardly directed walls 12 to 14. An exit 20 communicates with the conduit which leads the air to a carburetor or similar device not here shown and an air passage 22′ may be built into the device at a point above the filtering medium within body 8, whereby a blast of air may be directed through the filter in a counter direction to the normal flow of air passing therethrough when the device is in actual use. One of the extremely novel features of this invention resides in the filtering medium which is disposed within body 8. Broadly, this medium consists of a plurality of spines 22, arranged in tufts 24 throughout the length of the air passage formed by the innermost wall 12. As illustrated in Fig. 4, each tuft 24 is constructed of a number of spines 22, rebent upon themselves and supported in position by having their rebent ends forced through an opening 26, formed within wall 12, whereby loop 28 is formed to receive a fastening member 30 in the form of a wire passing around wall 12 within the reservoir formed between walls 12 and 14. Thus each tuft 24 and all its spines 22 are maintained in contact with filling 16.

The surface of each spine 22 is roughened or otherwise provided with a tooth so that capillary attraction will draw oil therealong from filling 16. The rebent end of each tuft 24 is rigid with respect to body 8 and the portion extending into the air passage is free to vibrate and, in view of the resiliency of spines 22, does so during the operation of any machine with which the filter is associated.

Tufts 24 are illustrated in the accompanying drawing in diagrammatical manner and just sufficient to show their use and general disposition. A filter having tufts 24 therein is literally filled with spines 22 and there are no open spaces through which air may pass to escape the collecting action of the oily surfaces of spines 22. Tufts 24 may be arranged in series as illustrated in Figs. 2 and 3. The rows of tufts 24 are progressively closer together as the exit end of body 8 is approached. Longitudinally, tufts 24 are in staggered relation. Since the passageway formed within body 8 is cylindrical, tufts 24 are directed toward the center to form a zone of overlap 32, adjacent the center of the air pasageway. This zone is disposed in the filter in the path of travel of the greatest amount of air and will, therefore, be effective in thoroughly filtering out foreign particles. With the construction just above set forth in mind, it is obvious that the density of the filtering medium (spines 22) gradually increases as exit 20 is approached. All spines 22 of tufts 24 are inclined from their fixed portion at loop 28 in a direction opposite to the normal direction of air flow.

For heavy duty filters where it is required to remove a large amount of foreign particles from the air, an auxiliary housing section 34 may be utilized which is preferably hingedly or detachably secured to the main body 8 of the filter. In the instance shown, this auxiliary portion 34 is hinged as at 36 and secured in place by hasp 38, which may be loosened to allow section 34 to swing away from the main portion of body 8.

Since spines 22 within section 34 are first to act upon the air, they collect from fifty to ninety percent, by weight, of the dust. When section 34 has been moved away from its normal position, collected dust may be removed from spines 22 by flushing a quantity of oil through section 34. The oil used to saturate material 16 is preferably a light, thin liquid with an oil base and which does not evaporate or congeal readily under ordinary working temperatures.

A filter constructed as just described is automatically freed of foreign particles collected from the air by constant vibration on the part of spine 22 and oftentimes by the backfiring of the carburetor with which the filter is combined. One of the important features of this invention is the fact that there are no stationary, fixed screens or other members through which air must pass to be cleaned. The intake end of body 8 is open and heavy particles collected by spines 22 may fall therefrom by gravity without the fear of their being collected or retained by any obstruction in their path of travel from the passage formed in housing 8.

Air passage 22 may be utilized to receive and cause a blast of compressed air to be passed into the filter against the free portion of spines 22. In this manner the filter may be cleaned without removing the same from an operative position.

Referring now to Fig. 5 wherein all of the salient features of the invention are incorporated, but in a form slightly different from that set forth in Figs. 1 to 4 inclusive, in this modified form shown in Fig. 5, body 50 is single-walled and a reservoir 52 filled with fibrous material 54 is disposed centrally of body 50. Tufts 56 formed of spines 58, exactly as before described, are projected into the passageway formed through body 50.

The portion of spines 58 free to vibrate is inclined downwardly, as illustrated, and the free ends of spines 58 rest against the annular wall of body 50. A filling conduit 60 is provided, through which material 54 may be saturated with the desired fluid for transmittal by capillary attraction to the toothed surfaces of spines 58. Tufts 56 may be arranged in numbers suitable to present sufficient dense impinging surfaces and they are preferably attached through the intermediacy of a wire 62 which passes between the rebent end of tufts 56 and the wall of reservoir 52.

A still further modification, illustrated in Fig. 6, indicates the possibilities of this in-invention. The air to be filtered is passing through a way formed within body 80 and stem 82 is supporting a large number of spines 84 in the path of travel of the air to be cleaned. Where a simple filter of this type if used, stem and spines 82 and 84 are merely dipped in a solution which adheres to the surfaces of spines 84 in a manner to collect particles from the air as it impinges against such surfaces.

Many modifications other than illustrated and described might be used when building filters in accordance with the broad concepts of this invention. It is desired to be limited only by the scope of the appended claims.

What is claimed as new and desired to be secured by Letters Patent is:

1. In a filter including a housing forming an air passageway; a plurality of spine tufts, within the passageway, each having a portion fixed against movement; said spines being increased in number as the exit end of said passageway is approached whereby the air passage area is decreased as the exit is approached.

2. An air filter comprising a housing; an air passageway formed by the housing having an entrance and an exit; a plurality of spine-tufts within the passageway, each having a portion fixed whereby the remaining portion thereof is free to vibrate; and means for supplying oil to said spine tufts.

3. An air filter comprising a cylindrical housing having a pair of spaced annular walls formed to present a reservoir; a filling of absorbent, oil soaked material within the reservoir; and a plurality of spines projecting into said housing from contact with the material in said reservoir.

4. An air filter comprising a cylindrical housing having a pair of spaced annular walls formed to present a reservoir; a filling of absorbent, oil soaked material within the reservoir; a plurality of spines projecting into said housing from staggered attaching points on the housing wall; and a removable section forming a part of the length of said housing.

5. A filter comprising a housing forming a fluid passageway; a series of overlapping spines secured to said housing and extending into said passageway, the number of spines to a given volume of said fluid passageway being increased as the exit thereof is approached.

6. A filter comprising a housing forming a fluid passageway; a plurality of series of spines extending into said fluid passageway, in each of said series of spines the number of spines to a given volume of the passageway is increased as the exit thereof is approached.

In testimony whereof, I hereunto affix my signature.

CHARLES A. ETEM.